United States Patent [19]

Boeyen et al.

[11] Patent Number: 5,746,648
[45] Date of Patent: May 5, 1998

[54] APPARATUS AND METHOD FOR MAKING A CUT IN AND PARTICULARLY REMOVING THE SPINE FROM A HALF

[75] Inventors: Johannes Wilhelmus Boeyen, Oss; Jan Johannes Meerdink, Ravenstein, both of Netherlands

[73] Assignee: Stork Protecon-Langen B.V., Oss, Netherlands

[21] Appl. No.: 566,309

[22] Filed: Dec. 1, 1995

[30] Foreign Application Priority Data

Dec. 2, 1994 [NL] Netherlands ............. 9402036

[51] Int. Cl.$^6$ ............................................. A22C 17/00
[52] U.S. Cl. ................................................. 452/156
[58] Field of Search ............................ 452/156, 171, 452/149, 135, 122

[56] References Cited

U.S. PATENT DOCUMENTS

| 3,546,737 | 12/1970 | Neebel et al. ............. 452/171 |
| 3,982,299 | 9/1976 | Kompan . |
| 4,134,181 | 1/1979 | Schneider, Jr. . |
| 4,979,269 | 12/1990 | Norrie .................... 452/171 |
| 5,037,349 | 8/1991 | Perreault . |
| 5,199,922 | 4/1993 | Korenberg et al. ......... 452/122 |
| 5,295,896 | 3/1994 | Petersen . |

FOREIGN PATENT DOCUMENTS

| 0502581 | 9/1992 | European Pat. Off. . |
| 558072 | 8/1923 | France . |
| 2747386 | 4/1978 | Germany . |

*Primary Examiner*—Willis Little
*Attorney, Agent, or Firm*—Webb Ziesenheim Bruening Logsdon Orkin & Hanson, P.C.

[57] ABSTRACT

Apparatus for making a cut in, and in particular removing the spine from a half, or a pare thereof, of an animal, for instance a pig, said apparatus including a frame with a receiving member supported thereby, for instance a supporting surface for the half, a separating member, for instance a saw, arranged close to the receiving member for applying an incision along the spine, transporting means for effecting a relative movement between the half and the separating member, and a sensor member of mechanical, optical or sonic type for determining the depth of the spinal marrow channel of the spine, so making it possible to determine the cross-dimension of the vertebral-bodies along the length of the spine and thereby to carry out the most effective cut.

20 Claims, 7 Drawing Sheets

APPARATUS AND METHOD FOR MAKING A CUT IN AND PARTICULARLY REMOVING THE SPINE FROM A HALF

BACKGROUND OF THE INVENTION

1. Field of the Invention

The invention relates to an apparatus for making a cut in, and in particular removing the spine from, a half or a part thereof, for instance a pig, in which the apparatus includes a frame with a receiving member supported thereby, for instance, a supporting surface for the half, a separating member, for instance a saw, arranged close to the receiving member for applying an incision at a distance from or closely along the spine, and transporting means for effecting a relative movement between the half and the separating member.

2. Background of the Prior Art

It is known from EP-A-0 502 581 to cut the spine out of the half by means of a circular saw or the like by making one or more lengthwise cuts round the spinal marrow. This provides an angled incision which, although arranged as closely as possible along the spine to avoid too many meat remnants on the removed spine, is nevertheless difficult to perform in practice When sawing is performed too close to the spine there is the danger of bone bridges which are later difficult to remove from the meat. It is otherwise possible to make a so-called back-belly cut in the half or part thereof which heretofore can only be made with difficulty at a predetermined distance from the spine.

The invention has for its object to provide an apparatus with which the cut can be made particularly efficiently and accurately at a distance from or round the spine without the above stated drawbacks occurring.

SUMMARY OF THE INVENTION

It has been determined experimentally that a saw cut round the spine, as seen in cross section, must run at a determined distance relative to the deepest point of the spinal marrow.

The apparatus according to the intention is distinguished by a sensor member of for instance mechanical, optical or sonic type for determining the depth of the spinal marrow channel of the spine.

The sensor member can be fixedly disposed and serves therein as a sort of guide for the spine. According to a further development this sensor member can on the other hand be connected to a control circuit for transverse and/or height adjustment of the separating member relative to the receiving member.

In order to prevent jamming of the spine the invention further proposes to give the mechanically embodied sensor member a form yielding in the transporting direction. In the case a separating plane through the spine is such that the spinal marrow channel is not fully open, the invention proposes to arrange a second sawing means close to the supporting surface for the purpose of opening the spinal marrow channel.

Circular saw-blades can be used as separating members.

According to another aspect of the invention the separating member is embodied as a curved blade running through the supporting surface, the sawing or cutting side of which lies in a plane perpendicular to the relative direction of movement and the supporting surface.

Due to the curved blade it is possible to follow the spinal marrow more precisely, as seen in cross section, and still avoid bone bridges.

In order to adapt the apparatus to a different type of half it is recommended to embody the separating member adjustably in a plane perpendicular to the supporting surface.

In a preferred embodiment the separating member is tubular, the center line of which extends parallel to the supporting surface. In this embodiment it is recommended to make the tubular separating member adjustable perpendicularly of respectively parallel to the supporting surface, whereby the desired adjustment can be effected in simple manner.

In order to obtain the relative movement between the half and the separating member, in one embodiment an endless element is arranged, of which the active part supporting the spine extends through the tubular separating member so that the removed spine is carried through the tubular member and the half is guided along outside.

The invention further relates to a method for removing a spine from a half of for instance a pig, starting from a halved spine in the half, wherein the half is laid on along the separation plane of the spine.

According to this method the deepest point of the open spinal marrow channel of the half is first measured on a random transverse plane of the spine, whereafter a curved or angled incision is made round the spine by one or more cutting or sawing means at predetermined distance from that deepest point.

According to a further proposal of the invention the method is characterized by determining relative to that deepest point at least three measurement points lying clear of the spine in order to determine the path of the incision in that transverse plane close to the spine.

How the spine develops from the ham to the shoulder side or vice versa depends on the particular type of animal, whereby the invention proposes to carry out the measurement only at the one or other end of the spine.

According to the invention the path of the incision can if desired be made in stepwise manner in longitudinal direction of the spine.

BRIEF DESCRIPTION OF THE DRAWINGS

Above mentioned and other features of the invention will be further elucidated in the figure description of an embodiment hereinbelow. In the drawings.

DESCRIPTION OF THE PREFERRED EMBODIMENT

Figure 1:
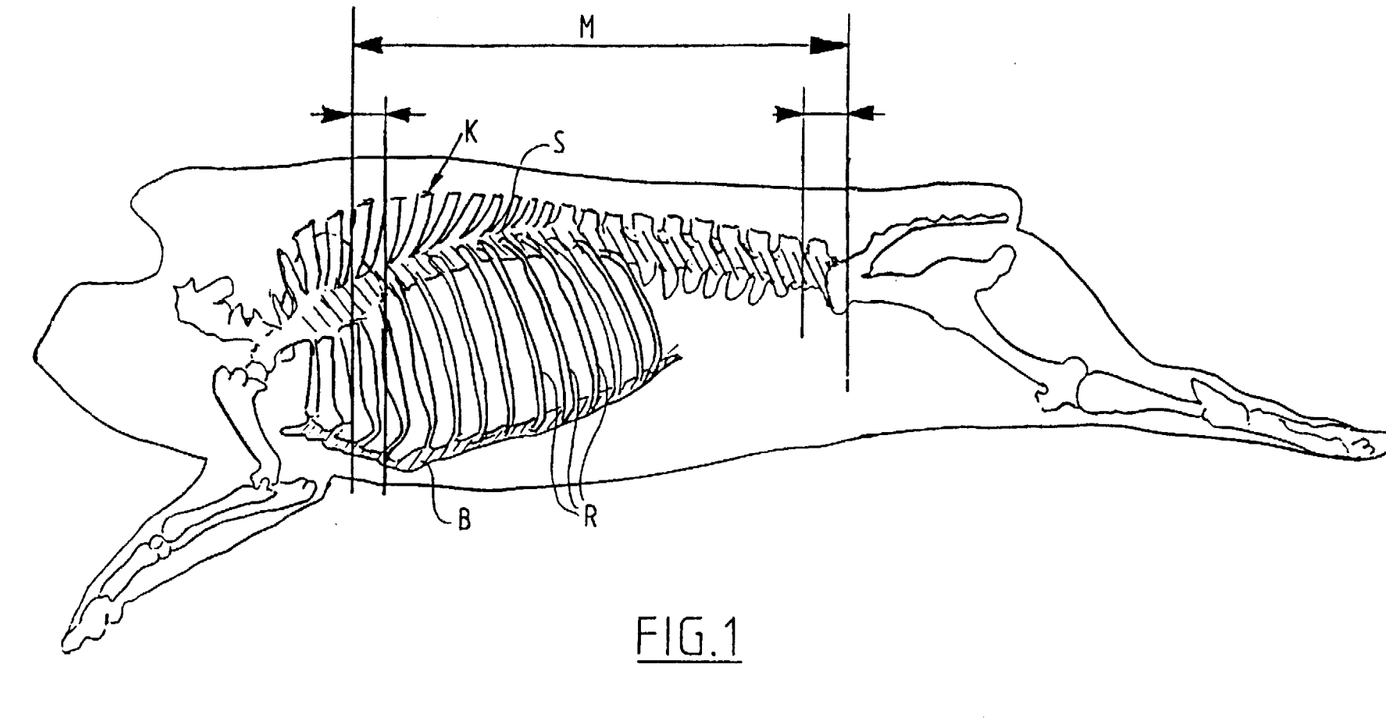
FIG. 1 shows a view of a slaughtered pig, with the half depicted schematically therein.

It is usual in the meat industry to remove the shoulder and ham side of the slaughtered animal, whereby the half M in FIG. 1 remains. The half consists of a spine S or spinal column, ribs R, breastbone B and backbone extensions K. It is usual here to saw through a half along the longitudinal central plane in order to obtain a half. The sawing plane is the separation plane which is laid onto a supporting surface of the apparatus of FIG. 2.

Figure 2:
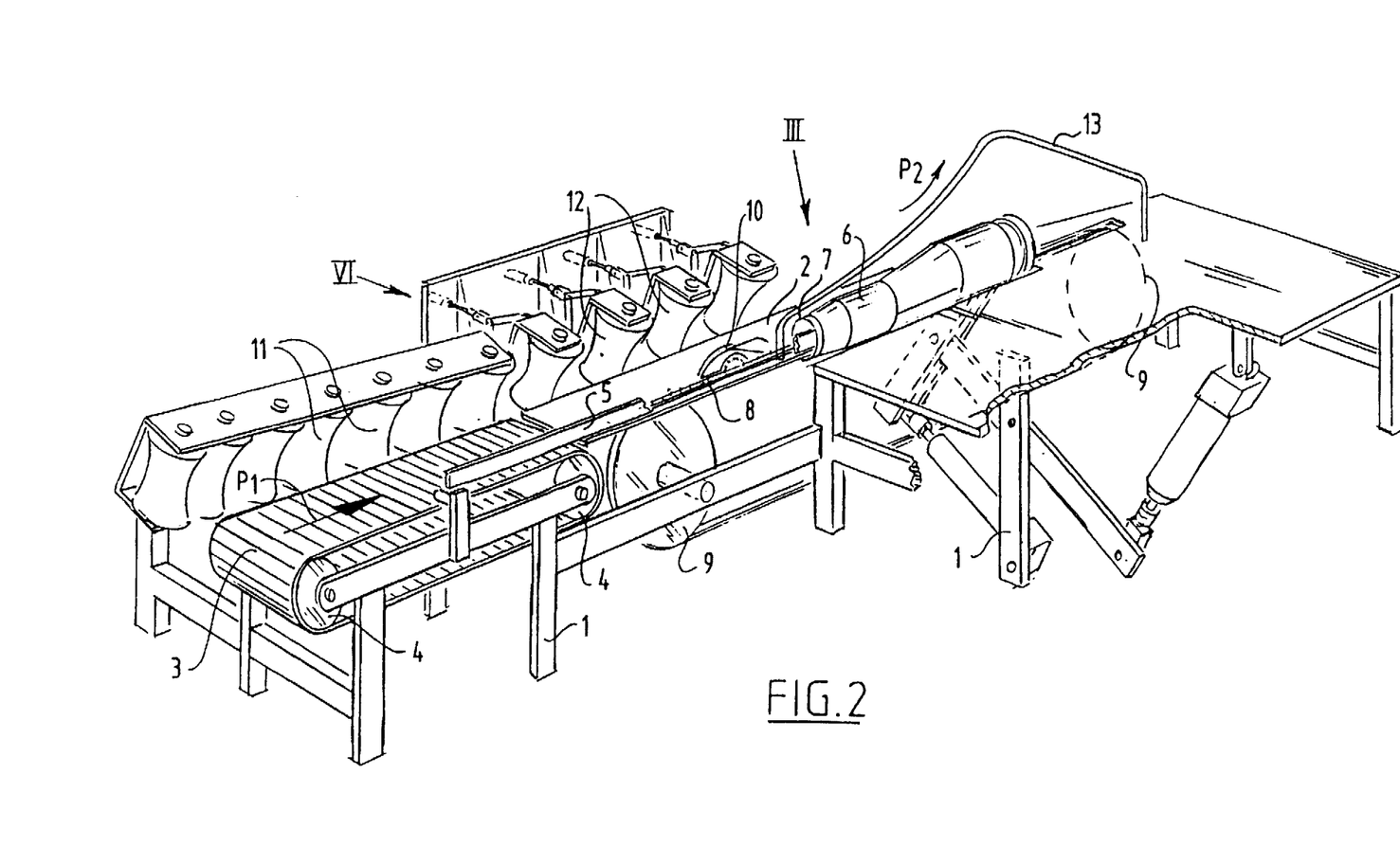
FIG. 2 shows a perspective standing view of an embodiment of the apparatus suitable for removing the spine from the half of FIG. 1.

With reference to FIG. 2, the embodiment shown therein of an apparatus for removing the spine consists of a frame 1 which can take random form and on which is arranged a top plate 2, the upper surface of which serves as supporting surface for the above mentioned half. Arranged at the front part of supporting surface 2 is a teed conveyor 3 which is driven in the direction of arrow P1, which is the transporting direction. A drive motor (not shown) on one of the reversing rollers 4 provides the movement of the upper part of the belt conveyor in the direction of arrow P1.

The plate 2 is provided along the right-hand lengthwise edge with a guide strip 5 such that the side of this strip facing away from the viewer provides together with the supporting surface of plate 2 an L-shaped guide surface along which the halves are guided and held securely.

On the side remote from the belt conveyor 3 the plate 2 is embodied with a tubular separating member 6, the cutting edge 7 of which is circular and is situated in a plane perpendicular to the support plate 2 and transporting direction P2. The guide strip 5 extends into the tubular separating member 6. On the inside of strip 5 is arranged an endless transport element in the form of a pin belt 8 which is trained round reversing wheels 9. Adjacently of this pin belt is a sensor 10 is placed in front of the tubular separating member 6 for determining the depth of the spinal marrow channel in the spine.

Finally, on the lengthwise side of the feed conveyor 3 and supporting plate 2 facing away from strip 5 are mounted a plurality of pressing members in the form of rollers 11 which are placed for mutually adjacent rotation and which hold the half for dressing securely against strip 5 and firmly on the upper supporting surface of plate 2. The support rollers 12 close to supporting plate 2 are placed under spring loading.

It should be noted finally that a guide bar 13 which extends from the cutting edge 7 of the separating member 6 to a point located behind separating member 6 such that a movement P2 is obtained varying from the transporting direction P1, which bracket serves to support the half M removed from the spine.

Figure 3:
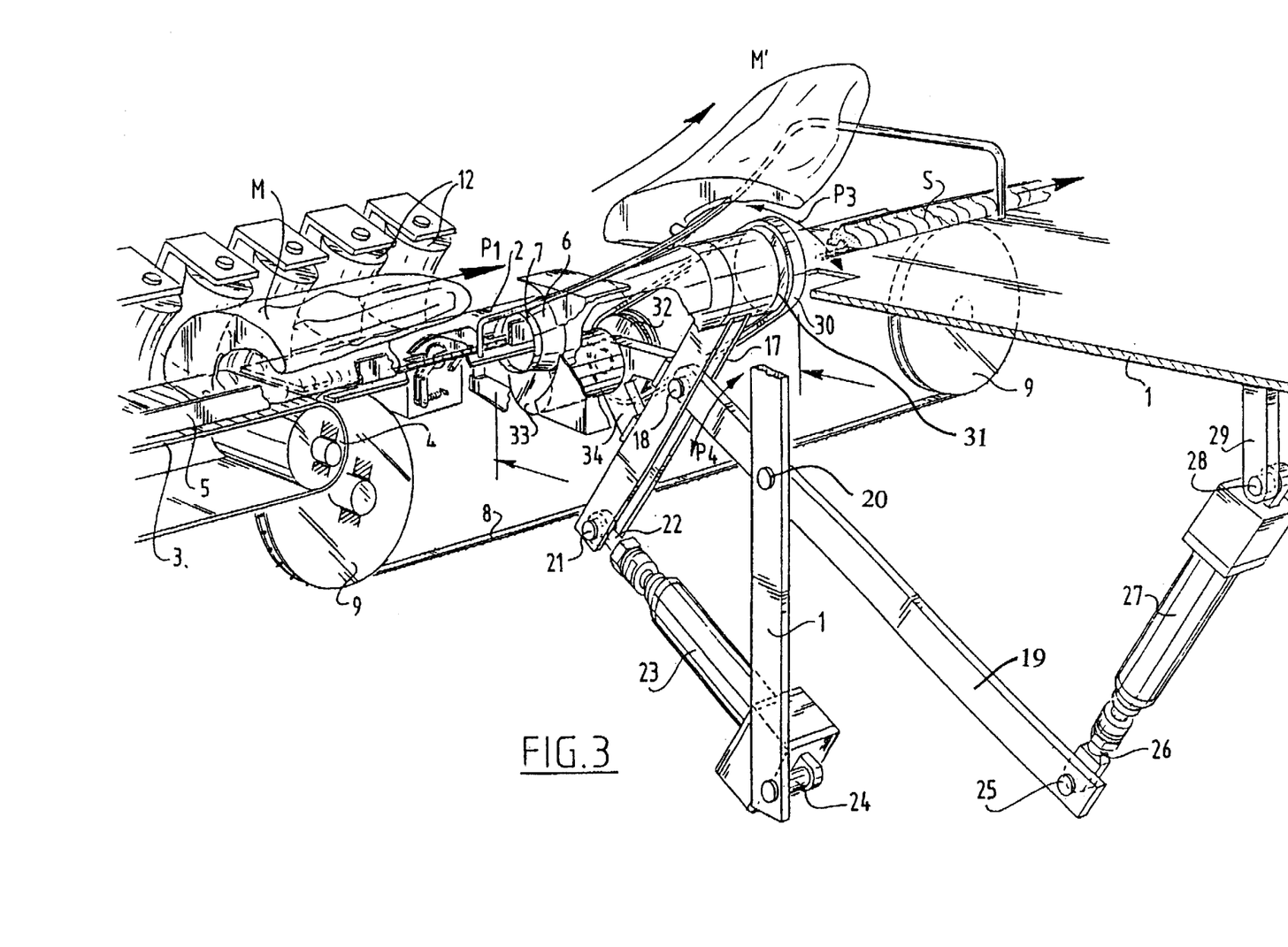
FIG. 3 is a view on enlarged scale corresponding with arrow III in FIG. 2 of a part of the apparatus.
Figure 4:
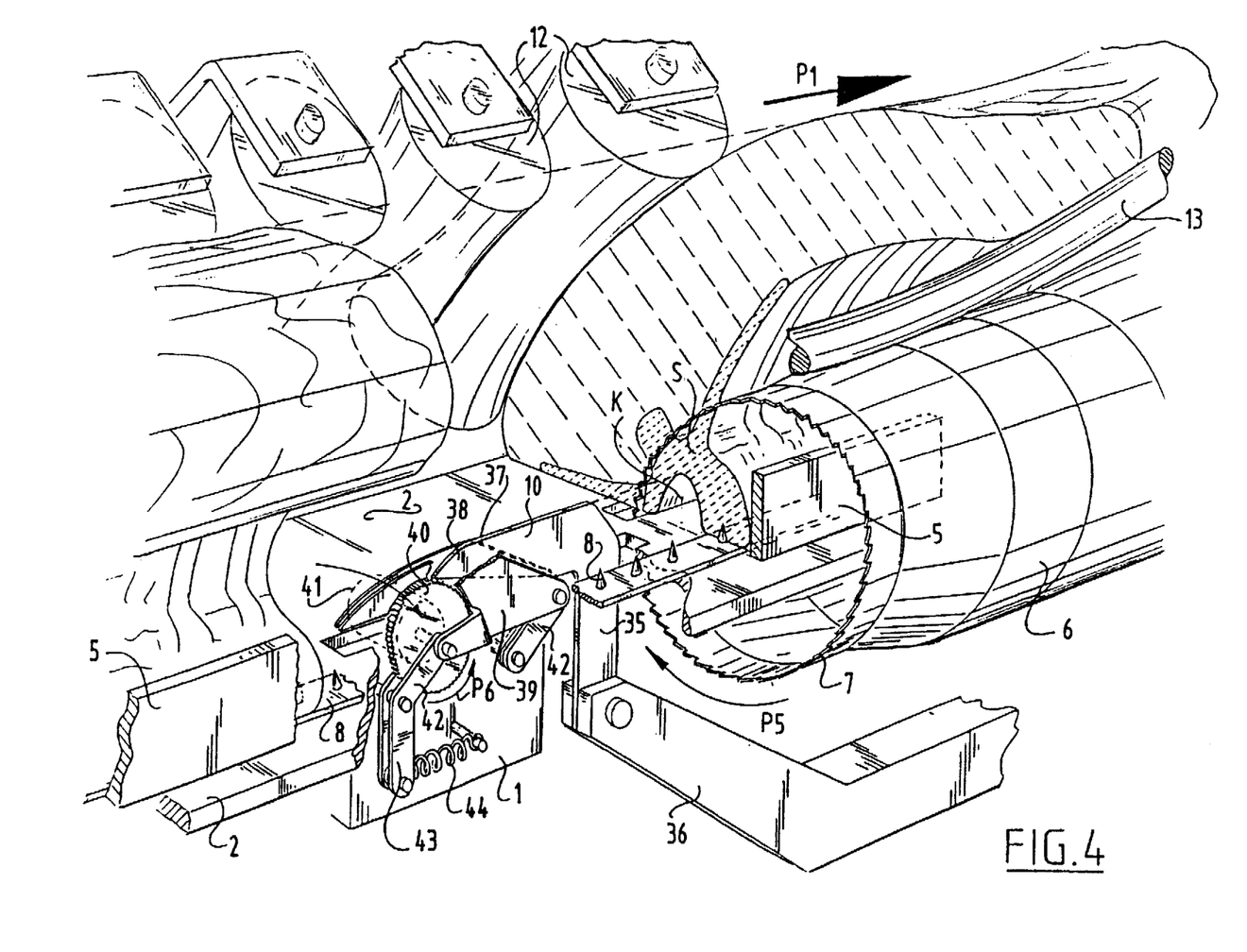
FIG. 4 shows a perspective view on still larger scale of the apparatus of FIG. 3 according to arrow IV.
Figure 5:
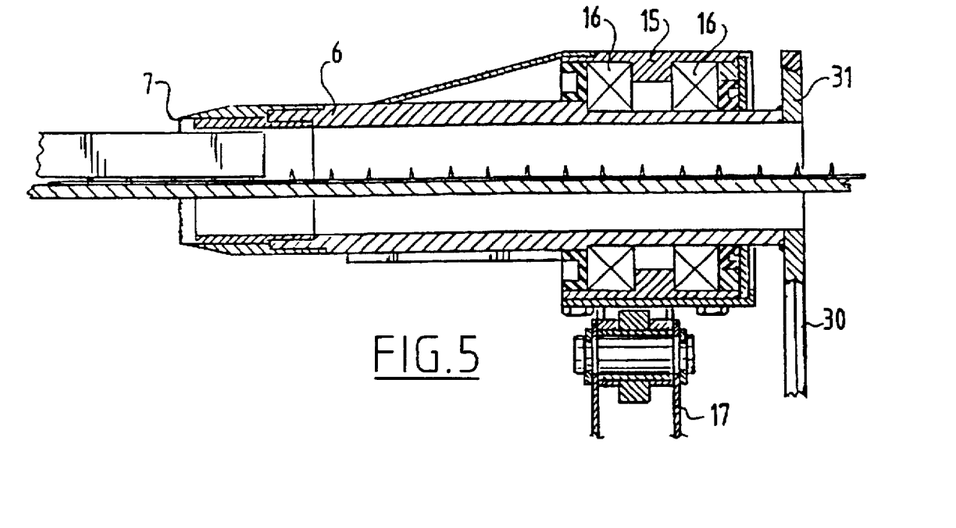
FIG. 5 shows a lengthwise section of the tubular separating member along line V—V in FIG. 3.

There now follows a description of the separating member and the adjustability thereof with reference to FIG. 3, 4 and 5. In these figures the same reference numerals as in FIG. 2 are used for the same components.

The separating member 6 is here tubular, wherein the leading end is provided with the above mentioned cutting edge 7. The actual tubular body 6 is mounted on the side remote torn cutting edge 7 by means of bearings 15 in a housing 16 which is supported by a double arm 17.

The double arm 17 is pivotally connected at 18 to an arm 19 which is itself hingedly coupled at 20 to a leg 1 of the frame 1.

The free end of the arm 17 is pivotally connected at 21 to the end of a piston rod 22 of a cylinder 23. The cylinder 23 supports at 24 on the leg 1 of the frame.

The free end of the arm 19 is connected at 25 to a piston rod 26 of a cylinder 27 which is pivotally coupled at 28 to a connecting arm 29 of the frame 1, see FIG. 3.

Energizing of cylinder 23 results in a pivoting movement round the point 18 in the direction of arrow P3 of the housing 15 and therewith of the tubular separating member 6.

Energizing of cylinder 27 results in a pivoting movement round the point 20 as according to arrow P4, and therewith of the housing 15 with tubular separating member 6. Combining of these two movements produces an adjustment of tubular member 6 in a direction transversely of the supporting plate 2 respectively in a direction parallel to the supporting surface thereof.

The tubular member 6 is driven by means of a belt 30 trained round a pulley 31 connected to the tube 6 on the end thereof remote from the cutting edge 7. Belt 30 is trained round a driven pulley 32 which is arranged on the motor shaft of motor 33. Motor 33 is supported on a bracket 34 of the arm 17.

With energizing of motor 33 a rotation of the tube 6 with cutting edge 7 connected thereto is effected in the direction of the arrow P5, see FIG. 4.

There now follows a description of the sensor member which projects as sensor 10 from the upper supporting surface of plate 2 and serves to determine the depth of the spinal marrow channel K in the spine S, see FIG. 4. The sensor 10 is a plate which extends in the transporting direction P1. The sensor plate can be disposed fixedly but is attached here to a downward pointing connecting arm 35. The latter is connected to a support 36 which is connected to a measuring cabinet (not shown). Incorporated in this measuring cabinet is a control circuit which serves to adjust respectively energize cylinders 23, 27. The height of the upper edge 37 of sensor 10 above the supporting surface 2 determines the setting of cylinders 23, 27 and therewith the position of the circular cutting edge 7 in relation to the supporting surface 2. Various aspects are further elucidated hereinbelow.

The sensor 10 is also provided with a rise edge 38 for easy entry into the spinal marrow channel K.

On either side of sensor plate 10 are arranged two guide plates 39 which likewise have a rise edge. The guide plates carry a saw wheel 40 mounted rotatably therebetween and driven by a motor 41 in the direction of the arrow P6.

The system of guide plates 39, saw wheel 40 and motor 41 is supported by two parallel rocker arms 42, the forward one of which is lengthened with an arm 43 connected by means of a spring 44 to the frame 1.

This parallel suspension ensures that the spinal marrow channel, which may possibly be closed on the underside due to the separation plane being arranged wrongly through the half, is opened because the point of the guide plates 39 protrudes in front of the saw 40 into the spinal marrow channel and the saw 40 can saw open the channel on the underside, whereby sensor 10 gains access from below to the channel K.

When on the other hand the channel K is not present due to the separation plane being located too high, the whole system of guide plates 39 and sensor 10 will be pressed downward.

Figure 6:
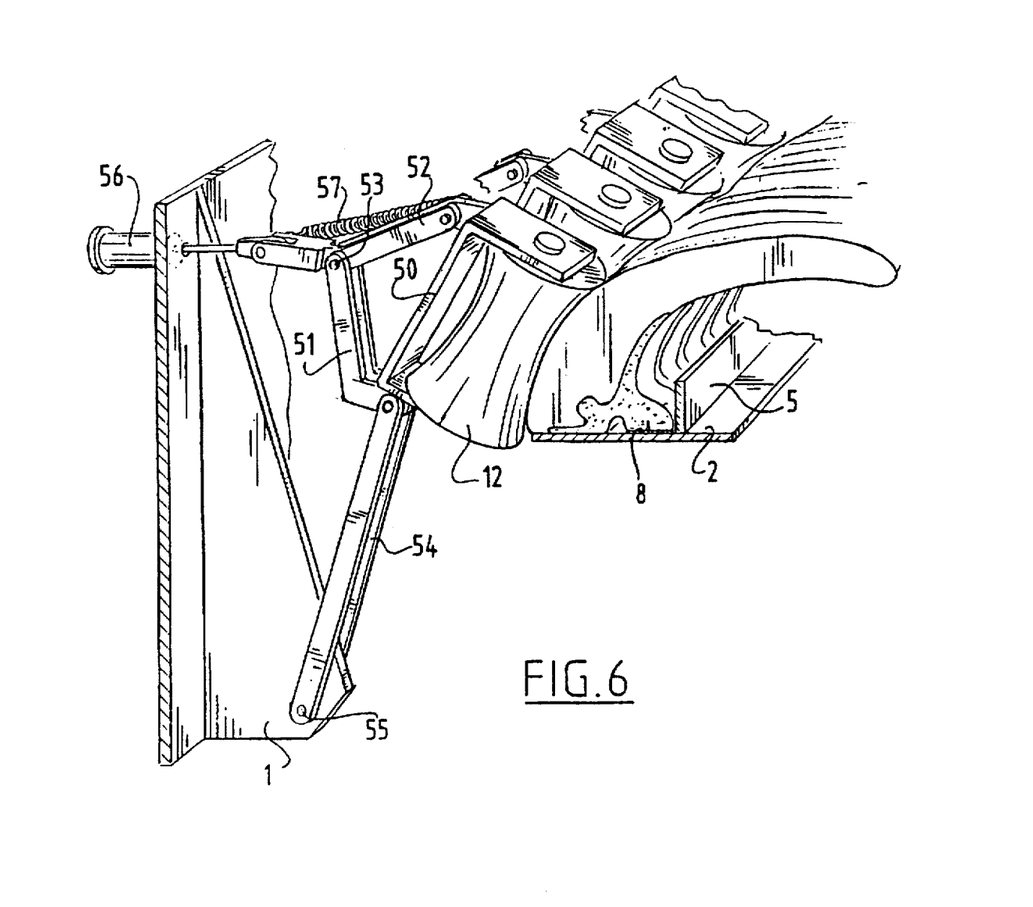
FIG. 6 shows a perspective view on enlarged scale of a detail of the pressing members used in the apparatus of FIG. 2.

The as yet unprocessed half is carried by the feed conveyor 3 to the support plate 2, wherein the half must also be guided along the strip 5. Serving for this purpose are a plurality of pressing members 11 which are fixedly disposed opposite the strip 5 and a plurality of movable pressing members 12 which are further shown in FIG. 6.

These pressing member are all embodied in the form of diabolo-shaped rotating bodies. At top and bottom they are mounted in a bracket 50 which is fixed on the underside to a pivot arm 51. The upper side is fixed to a pivot arm 52 and the two are mutually connected for pivoting at 53. The two pivot arms 51, 52 are supported by a third pivot arm 54 which is pivotally connected to frame 1 at 55. A pressure element 56 exerts a force directed to the right in FIG. 6 away from the frame 1 onto the arms 51, 52, and therewith onto bracket 50, in the direction of the strip 5 on support plate 2. A resetting spring 57 provides a resetting movement when pressure element 56 is rendered inoperative.

The above described apparatus operates as follows.

The half M is laid with the separating surface onto the upper part of the feed conveyor 3, whereby it is then transported to the right in FIG. 1 in the direction of arrow P1. At the transition onto the supporting surface of plate 2 the spine is carried along onto the separating surface by the pins of the pin belt 8. The inside of the spine S is pressed against the strip 5 by the pressing rollers 11, 12, whereby the half is positioned and held securely. It can nevertheless still be moved forward in lengthwise direction of the conveyor or transporting direction P1 by suitable driving of the pin belt 8. By causing the cutting edge 7 to rotate a determined curved saw cut is applied through the spine S whereby the ribs and a part of the vertebrae stays behind in the remaining meat. No bone bridges occur here so that the parts remain separately of each other in the meat. The spine itself is carried away through the tube G, while the half is transported away sideways in the direction of arrow P2 by the bracket 13.

During this operation the sensor 10 will measure the depth of the channel K and therefore provide the setting of the cutting edge 7.

Figure 7:
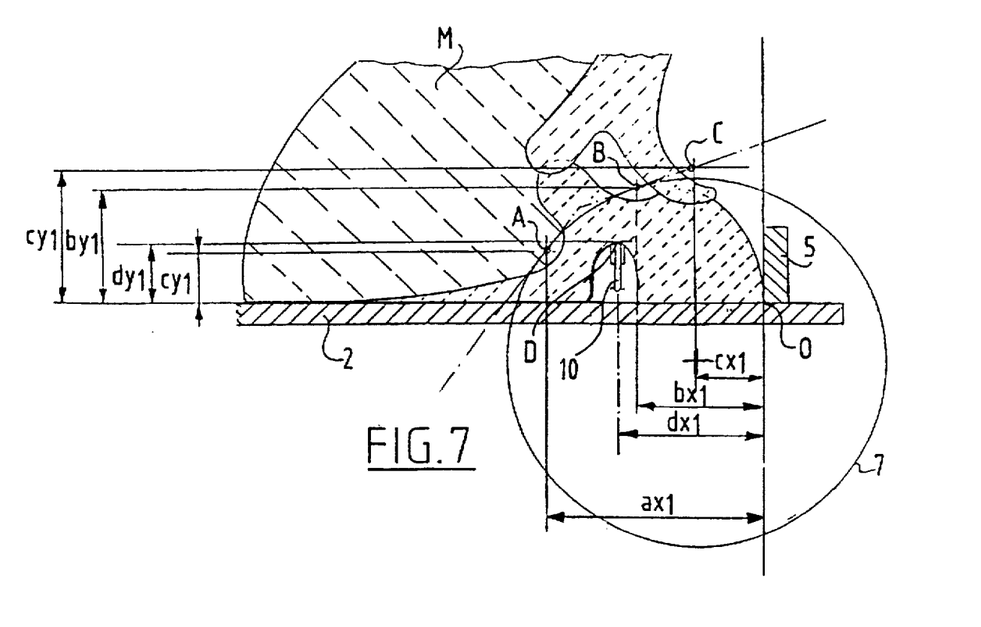
FIGS. 7 and 8 show cross sections through a spine having meat attached thereto on the ham respectively shoulder side, for elucidation of the method according to the invention.
Figure 8:
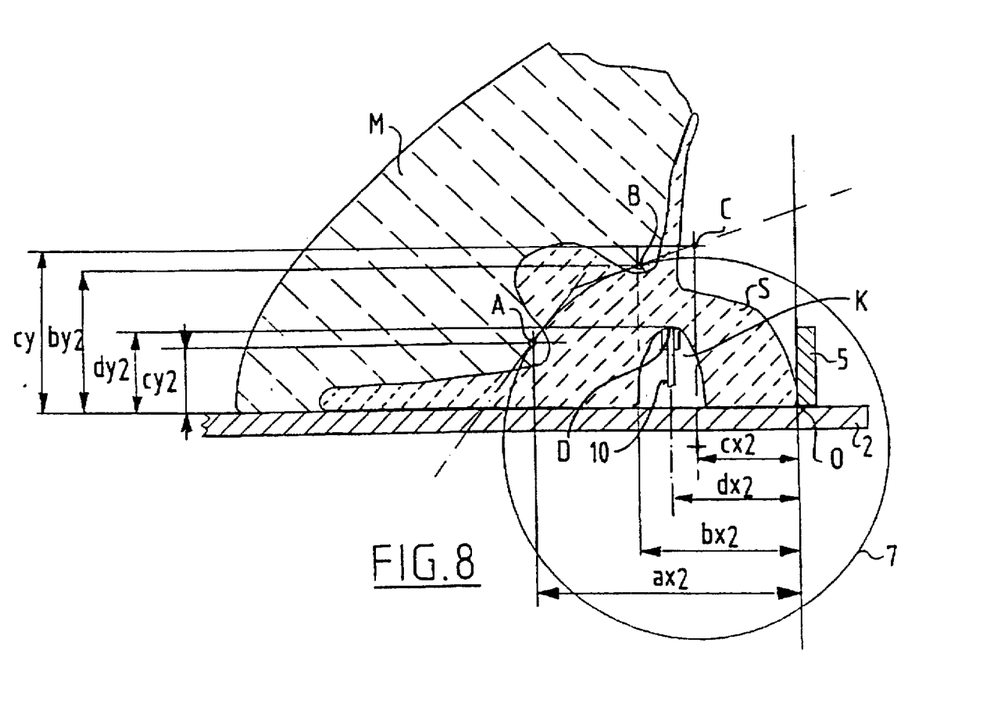

Various aspects are based on the method according to the invention which is now elucidated further with reference to FIG. 7 and 8.

By determining the coordinates of the deepest point D of the spinal marrow channel K by means of the sensor 10 in relation to the origin O, this being the point of intersection of the supporting upper surface of plate 2 and the guide surface of strip 5, the desired saw cut can be determined.

Taken as starting point for this purpose are experimentally defined sawing points A, B and C, of which the coordinates ax, ay, and bx, by and cx, cy are therefore known. These points are approximated as precisely as possible by the circular sawing edge 7 by adjusting the tubular separating member with sawing edge 7 in the correct direction relative to the origin O.

Use can be made herein of a continuous displacement resulting from the continuous monitoring of the deepest point D of the channel as this is moved over the sensor 10.

Figure 9:
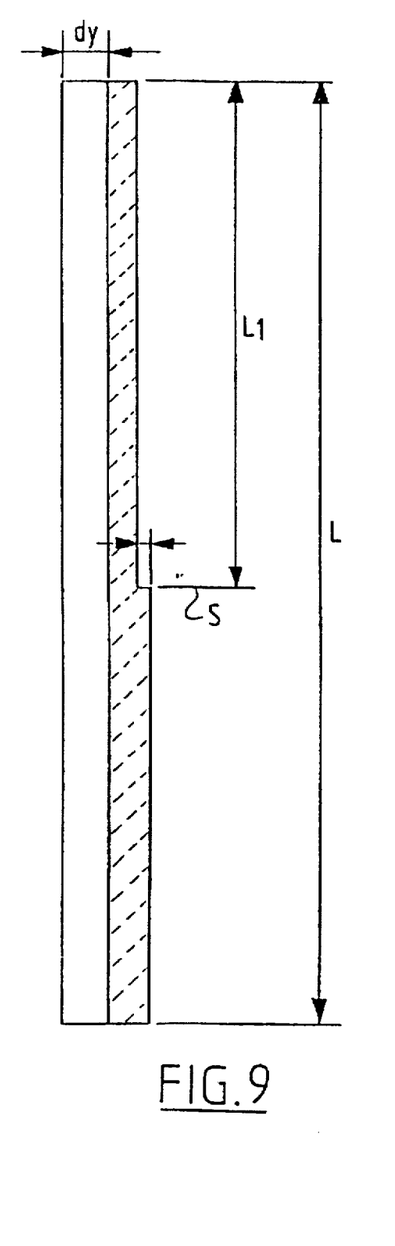
FIG. 9 shows the height displacement of the path of the saw cut perpendicularly of that supporting surface as seen in lengthwise direction of the spine.

It is on the other hand possible in a simple embodiment to apply a stepped saw cut, see FIG. 9, by once moving the tubular separating member in the y direction toward respectively away from the supporting surface 2. The half can in any case be fed in with the ham side or shoulder side facing forward, depending on whether it the right or left-hand part of the half which must be processed.

According to an even simpler embodiment of the method the coordinates of point D only have to be measured at the entry point of the spinal marrow channel, whereafter the further path of the saw cut over the length direction of the spine is carried out automatically, since it is assumed that in the case of a particular group of animals for dressing the dimensions are the same.

The invention is not limited to the above described embodiment of the invention. This described apparatus is based on a circular saw cut but is equally possible to realize a more or less more oval shape of the saw cut if use is made of a band saw, the sawing edge of which acts in a plane cross-wise to the transporting direction. This band saw can be curved by suitable rollers into the correct shape, whereby a saw cut comes to lie more toward the points A, B and C.

Use can nevertheless also be made of one or more circular saw-blades which make a part of the total saw cut but at a different angle in each case in order finally to approximate the desired smooth cut.

Although the embodiment as described above discloses an adjustment of the saw means 6 with respect to the supporting surface 2 and/or the guide strip 5 it will be clear that also said surface and/or strip can be adjusted relative to said saw means 6.

The sensor 10, which takes a mechanical form in the described embodiment, can be embodied in other manner, for instance in optical, electronic, electrical (capacitive) or ultrasonic manner.

We claim:

1. An apparatus for removing a spine from a part of a slaughtered animal, said apparatus comprising: a frame with a receiving member supported thereby; a separating member arranged close to the receiving member for applying an incision along the spine; transporting means for effecting a relative movement between the part of the slaughtered animal and the separating member; and a sensor member carried on the frame for determining a depth of a spinal marrow channel of the spine.

2. The apparatus as claimed in claim 1, wherein said sensor member includes a mechanical sensor placeable in the channel and arranged as a sensor means for determining the depth of the spinal marrow channel of the spine.

3. The apparatus as claimed in claim 1, wherein said sensor member is connected to a control circuit for at least one of transverse and height adjustment of the separating member relative to the receiving member.

4. The apparatus as claimed in claim 2, wherein said mechanical sensor is configured to yield in at least one of a transport direction and a direction perpendicular thereto.

5. An apparatus for removing a spine from a part of a slaughtered animal, said apparatus comprising: a frame with a supporting surface supported thereby for the part an elongated tubular separating member arranged close to the supporting surface for applying an incision along the spine; and a transporting means for effecting a relative movement between the part and the separating member, wherein the tubular separating member has a cutting edge configured as a curved blade running through the supporting surface and wherein a cutting side of the blade lies in a plane substantially perpendicular to a relative direction of movement of the part and the supporting surface.

6. The apparatus as claimed in claim 5, wherein the cutting side is adjustable in at least one of shape and position in the perpendicular plane relative to the supporting surface.

7. The apparatus as claimed in claim 2, wherein said separating member is tubular and wherein a center line of the separating member extends substantially parallel to the supporting surface.

8. The apparatus as claimed in claim 7, wherein the tubular separating member and the supporting surface are adjustable in at least one of height and transverse direction relative to each other.

9. The apparatus as claimed in claim 7, wherein the transporting means is a driven endless element having an active part extending through the tubular separating member.

10. The apparatus as claimed in claim 9, wherein said receiving member is a supporting surface which is L-shaped in cross section, and wherein at least one pressing member is arranged opposite an inside corner thereof.

11. The apparatus as claimed in claim 10, further including a second cutting means protruding out of the supporting surface, the second cutting surface configured to open the spinal marrow channel.

12. A method for removing a spine from a half of a slaughtered animal, comprising the steps of: determining a deepest point of an open spinal marrow channel; and making at least one of a curved and angled incision in a random transverse plane of the spine round the spine at a predetermined distance from the deepest point.

13. The method as claimed in claim 12, including the step of determining at least three measurement points lying clear of the spine in relation to the deepest point in order to determine the progress of the incision in that transverse plane.

14. The method as claimed in claim 12, wherein the determination of the deepest point takes place at either end of the spine.

15. The method as claimed in claim 12, wherein the incision is performed in steps in a longitudinal direction of the spine.

16. The apparatus as claimed in claim 3, wherein said mechanical sensor member is configured to yield in at least one of a transport direction and a direction substantially perpendicular thereto.

17. The apparatus as claimed in claim 5, wherein a center line of the separating member extends substantially parallel to the supporting surface.

18. The apparatus as claimed in claim 1, wherein said receiving member is a supporting surface which is L-shaped in cross section, and wherein at least one pressing member is arranged opposite an inside corner thereof.

19. The apparatus as claimed in claim 1, further including a second cutting means protruding out of the supporting surface the second cutting means configured to open the spinal marrow channel.

20. The method as claimed in claim 13, wherein the determination of the deepest point takes place at either end of the spine.

* * * * *

UNITED STATES PATENT AND TRADEMARK OFFICE
CERTIFICATE OF CORRECTION

PATENT NO.  : 5,746,648
DATED       : May 5, 1998
INVENTOR(S) : Johannes W. Boeyen et al.

It is certified that error appears in the above-identified patent and that said Letters Patent is hereby corrected as shown below:

Title Page, [57] ABSTRACT, line 2, "pare should read --part--.

Column 1 Line 24 after "practice" insert period --.--.

Column 1 Line 40 "intention" should read --invention--.

Column 3 Line 12 "teed conveyor" should read --feed conveyor--.

Column 3 Lines 47-48 "FIG. 3, 4 and S" should read --FIG. 3, 4 and 5--.

Column 3 Line 54 "remote tom" should read --remote from--.

Column 5 Line 24 "tube G" should read --tube 6--.

Claim 5 Column 6 Line 41 after "part" insert semicolon --;--.

Claim 19 Column 8 Line 15 after "surface" insert comma --,--.

Signed and Sealed this

Eleventh Day of August 1998

Attest:

BRUCE LEHMAN

Attesting Officer

Commissioner of Patents and Trademarks